United States Patent
Im et al.

(10) Patent No.: US 11,521,497 B2
(45) Date of Patent: Dec. 6, 2022

(54) METHOD AND SYSTEM FOR RECOGNITION OF OBJECTS NEAR SHIP BY USING DEEP NEURAL NETWORK

(71) Applicant: Hoseo University Academic Cooperation Foundation, Asan-si (KR)

(72) Inventors: Tae Ho Im, Seoul (KR); Hyo Chan Lee, Cheonan-si (KR)

(73) Assignee: HOSEO UNIVERSITY ACADEMIC COOPERATION FOUNDATION, Asan-si (KR)

(*) Notice: Subject to any disclaimer, the term of this patent is extended or adjusted under 35 U.S.C. 154(b) by 409 days.

(21) Appl. No.: 16/680,964

(22) Filed: Nov. 12, 2019

(65) Prior Publication Data

US 2020/0365035 A1 Nov. 19, 2020

(30) Foreign Application Priority Data

May 13, 2019 (KR) .................. 10-2019-0055916

(51) Int. Cl.
| | | |
|---|---|---|
| *G08G 3/02* | (2006.01) | |
| *G06N 3/04* | (2006.01) | |
| *G06N 3/08* | (2006.01) | |
| *G06V 10/20* | (2022.01) | |

(52) U.S. Cl.
CPC .......... *G08G 3/02* (2013.01); *G06N 3/0454* (2013.01); *G06N 3/08* (2013.01); *G06V 10/255* (2022.01)

(58) Field of Classification Search
CPC ...... G06N 3/0454; G06N 3/08; G06V 10/255; G06V 10/454; G06V 10/82; G06V 20/52; G06V 10/95; G06V 10/955; G06V 20/00; G06V 2201/00; G08G 3/02; G05D 1/0206; G06T 2207/10012; G06T 2207/20084; G06T 2207/30261; G06T 7/593; H04N 13/239; H04N 2013/0081
See application file for complete search history.

(56) References Cited

U.S. PATENT DOCUMENTS

| | | | | |
|---|---|---|---|---|
| 9,760,827 | B1 * | 9/2017 | Lin | G06N 3/04 |
| 9,963,215 | B2 * | 5/2018 | Sidki | B63B 35/00 |
| 10,007,269 | B1 * | 6/2018 | Gray | G06K 9/6263 |
| 10,019,002 | B2 * | 7/2018 | Harnett | G01S 15/96 |
| 10,095,992 | B1 * | 10/2018 | Brestoff | G06N 3/04 |
| 10,782,691 | B2 * | 9/2020 | Suresh | G06V 20/00 |
| 10,967,824 | B1 * | 4/2021 | Pertsel | B60R 21/01538 |
| 11,112,796 | B2 * | 9/2021 | Djuric | G05D 1/0088 |

(Continued)

*Primary Examiner* — Babar Sarwar
(74) *Attorney, Agent, or Firm* — Lex IP Meister, PLLC (57) ABSTRACT

The present invention relates to a method and a system for recognition of objects near a ship by using a deep neural network to prevent a collision with the object by recognizing a neighboring object that may be risky to the ship sailing in a restricted condition such as a foggy environment. All object movements within a predetermined radius are detected and recognized so that collision accidents with objects on the sea in an environment such as fog caused by bad weather at sea can be prevented, and a risk alarm is notified to a captain when the object is detected so that collision accidents can be remarkably reduced. In addition, peripheral environments are detected by only installing a CCTV camera so that expenses can be reduced, human negligence can be prevented, and the system can be easily constructed to prevent collisions.

3 Claims, 6 Drawing Sheets

(56) References Cited

U.S. PATENT DOCUMENTS

| | | | | |
|---|---|---|---|---|
| 2017/0169208 A1* | 6/2017 | Jantz | .................. | G06F 21/44 |
| 2018/0130355 A1* | 5/2018 | Zia | .................. | G08G 1/0962 |
| 2019/0012551 A1* | 1/2019 | Fung | .................. | G06V 10/82 |
| 2019/0049970 A1* | 2/2019 | Djuric | .................. | B60W 60/00276 |
| 2019/0220605 A1* | 7/2019 | Kounavis | .................. | G06N 3/0454 |
| 2019/0228305 A1* | 7/2019 | Lovison | .................. | G06K 9/6271 |
| 2019/0259284 A1* | 8/2019 | Khadloya | .................. | G06V 10/25 |
| 2019/0385430 A1* | 12/2019 | Criado-Perez | .................. | G08B 13/196 |
| 2020/0050202 A1* | 2/2020 | Suresh | .................. | G06V 10/82 |
| 2020/0174490 A1* | 6/2020 | Ogale | .................. | G05D 1/0221 |
| 2020/0210765 A1* | 7/2020 | Chinni | .................. | G06V 10/764 |
| 2020/0327465 A1* | 10/2020 | Baek | .................. | A61B 5/1123 |
| 2021/0287539 A1* | 9/2021 | Cronje | .................. | H04L 67/12 |

* cited by examiner

METHOD AND SYSTEM FOR RECOGNITION OF OBJECTS NEAR SHIP BY USING DEEP NEURAL NETWORK

BACKGROUND OF THE INVENTION

1. Field of the Invention

The present invention relates to a method and a system for recognition of objects near a ship by using a deep neural network, and more particularly, to a method and a system for recognition of objects near a ship by using a deep neural network to prevent a collision with the object by recognizing a neighboring object that may be risky to the ship sailing in a restricted condition such as a foggy environment.

2. Description of the Related Art

A transportation device, such as a ship, for carrying large quantities of cargoes or passengers may cause mass casualties, fatal accidents of lives, physical losses, and the like upon a single accident even though the frequency of accidents is low. Although a ship moves along a preset route, a collision accident may occur near a harbor or at sea because there is no formal way such as a road. In recent five years, a sailing negligence leads to 98% of ship accidents, causing a number of casualties. This is because that the ship accidents occur due to a bad weather or a human error such as drowsiness during sailing at dawn, or carelessness. Recently, studies have been conducted to reduce the negligence by installing a camera on the ship and using an image analysis and notification system to prevent the negligence that may be caused by a human.

In particular, fog exerts various impacts on industrial fields. Fog on a road mainly affects traffic accidents. According to the statistics of the Road Traffic Safety Authority, the mortality rate on a foggy day is relatively higher on the basis of the number of accidents. The weekly mortality rate on fog days is about 8%, and the nightly mortality rate is about 14%. In addition, the number of deaths per 100 persons subject to the traffic accidents are 3.3 persons on a clear weather, 4.4 persons on a cloudy weather, 4.1 persons on a rainy weather, 11 persons on a foggy weather, and 4.2 persons on a snowy weather. The number of deaths on a foggy day is about three times the number of deaths on other days. Similarly in the case of ships, in bad weather conditions such as heavy foggy or wavy weather, it is difficult to recognize an approach of a neighboring ship in advance or avoid a collision situation.

PRIOR TECHNICAL DOCUMENTS

Patent Documents (Patent Document 1) KR 10-1480220 B1

SUMMARY OF THE INVENTION

In order to solve the above conventional problems, exemplary embodiments of the present invention provides an image recognition and detection system to prevent a collision accident with an object on the sea in an environment such as fog caused by bad weather at the sea by detecting and recognizing all object movements within a predetermined radius and notifying a risk alarm to a captain when the object is detected, so that the accidents can be remarkably reduced.

To this end, the method for recognizing an object near a ship by using a deep neural network according to embodiments of the present invention includes: (a) receiving an image being photographed from a camera mounted on the ship; (b) preprocessing the received image; (c) inputting the preprocessed image as input data into a deep-learning-based deep neural network model, and outputting information on an object recognized in the image (hereinafter referred to as 'object recognition information') from the deep neural network model; (d) analyzing a risk level due to the object based on the object recognition information outputted from the deep neural network model; and (e) taking an action according to the analyzed risk level.

Step (b) may include:(b1) detecting key points of a specific object in the received image; (b2) determining points forming a cluster as an object, and estimating a midpoint of a corner point cluster based on coordinates of detected corner points; and (b3) enlarging an image of a part determined as the object from coordinates of the midpoint.

The detecting of key points may include detecting corner points by performing a corner point detection algorithm.

The deep neural network model may include a convolutional neural network (CNN).

The deep neural network model may include You Only Look Once (YOLO).

The deep neural network model may include both of the CNN and the YOLO.

Step (c) may include: (c1) inputting image data obtained by preprocessing the photographed image into the YOLO model capable of fast object recognition; (c2) when the object is recognized from an output of the YOLO model, extracting an object area recognized from the image data; (c3) inputting an image of the extracted object area into the CNN model; and (c4) outputting, by the CNN model, information on the recognized object (hereinafter referred to as 'object recognition information').

Step (d) may be to analyze the risk level from risk level table data organized into a table in a database with respect to the object recognition information outputted in step (c).

The action of step (e) may include controlling the ship through an automatic ship control device for risk aversion, or performing a risk notification through an alarm sound, a display on a monitoring screen, or the like, when a degree of risk is high based on the risk level analyzed in step (d).

According to another aspect of the present invention, the system for recognizing an object near a ship by using a deep neural network includes: at least one processor; and at least one memory configured to store a computer executable instruction, wherein the computer executable instruction stored in the at least one memory allows the at least one processor to execute: (a) receiving an image being photographed from a camera mounted on the ship; (b) preprocessing the received image; (c) inputting the preprocessed image as input data into a deep-learning-based deep neural network model, and outputting information on an object recognized in the image (hereinafter referred to as 'object recognition information') from the deep neural network model; (d) analyzing a risk level due to the object based on the object recognition information outputted from the deep neural network model; and (e) taking an action according to the analyzed risk level.

According to still another aspect of the present invention, the computer program for recognizing an object near a ship by using a deep neural network is stored in a non-transitory storage medium, and includes an instruction for allowing the processor to execute: (a) receiving an image being photographed from a camera mounted on the ship; (b) preprocessing the received image; (c) inputting the preprocessed image as input data into a deep-learning-based deep neural network model, and outputting information on an object recognized in the image (hereinafter referred to as 'object recognition information') from the deep neural network model; (d) analyzing a risk level due to the object based on the object recognition information outputted from the deep neural network model; and (e) taking an action according to the analyzed risk level.

According to still another aspect of the present invention, the system for recognizing an object near a ship by using a deep neural network an image data receiver configured to receive an image, which is being photographed, from a camera mounted on the ship; an image data preprocessor configured to preprocess the received image to use the received image as an input into a deep neural network model of the present invention for recognizing an object near the ship; an object detection and recognition unit configured to output information on the object recognized by a deep-learning-based deep neural network model for recognizing an object near the ship; a risk level analyzer configured to analyze a risk level due to the object based on the information on the recognized object; and a risk level action unit configured to take an action according to the analyzed risk level.

According to the embodiments of the present invention, all object movements within a predetermined radius are detected and recognized, so that collision accidents with objects on the sea in an environment such as fog caused by bad weather at sea can be prevented, and a risk alarm is notified to a captain when the object is detected, so that collision accidents can be remarkably reduced. In addition, peripheral environments are detected by only installing a CCTV camera so that expenses can be reduced, human negligence can be prevented, and the system can be easily constructed to prevent collisions.

BRIEF DESCRIPTION OF THE DRAWINGS

Hereinafter, exemplary embodiments of the present invention for achieving the effects will be described in detail with reference to the accompanying drawings.

DETAILED DESCRIPTION OF THE INVENTION

Hereinafter, preferred embodiments of the present invention will be described in detail with reference to the accompanying drawings. The terms and words used in the specification and claims of the present invention should not be construed as limited to a conventional or lexical meaning, and should be construed as the meanings and concepts based on the principle that "an inventor may define the concept of the term properly in order to describe the invention in the best way". Accordingly, the embodiments described herein and the configurations shown in the drawings are merely preferred embodiments according to the present invention, and do not represent all of the technical ideas of the present invention. Therefore, it should be understood that various equivalents and modifications may be substituted therefor at the time of filing of the present application.

Figure 1:
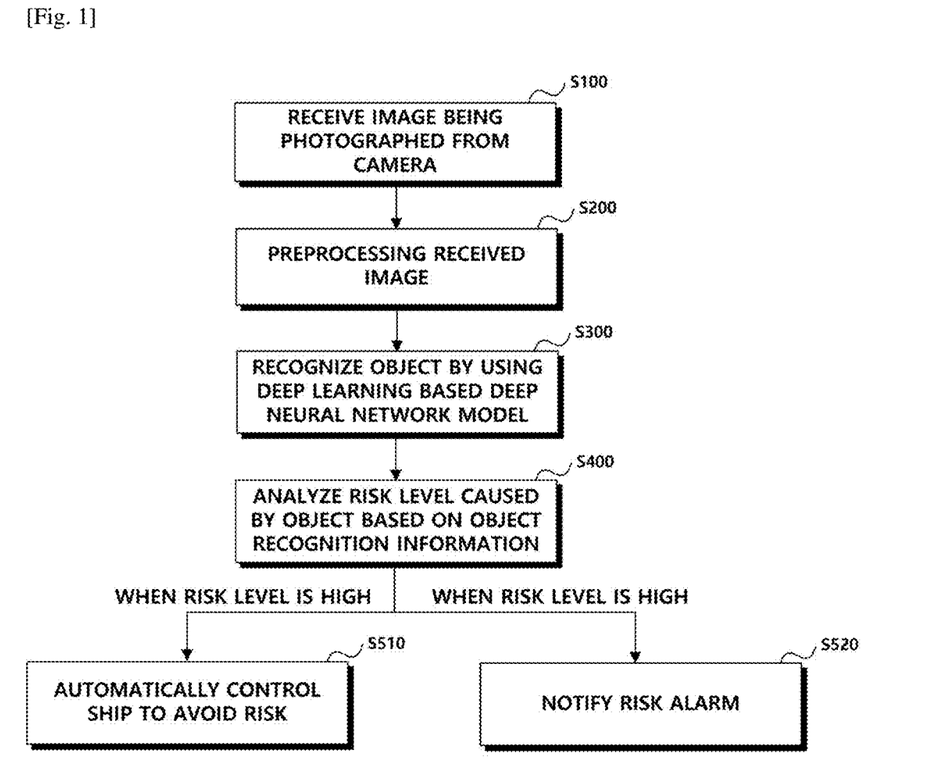
FIG. 1 is a flowchart showing a method for recognizing an object near a ship by using a deep neural network according to the present invention.

FIG. 1 is a flowchart showing a method for recognizing an object near a ship by using a deep neural network according to the present invention.

First, an image being photographed is received from the camera mounted on the ship (S100). The camera may, for example, be a CCTV camera. The received image is preprocessed to be used as an input into the deep neural network model for recognizing an object near the ship (S200); Preprocessing step S200 may enable the object recognition to be performed more effectively, especially, in the case of using an image, which is photographed in an environment such as fog difficult for the image process, as an input, or using an image, which includes an object that is too small to be recognized, as an input. The preprocessing S200 will be described in detail with reference to FIG. 2.

The preprocessed image is inputted as input data to the deep-learning-based deep neural network model according to the present invention for recognizing an object near a ship, and information on the recognized object is outputted (S300). The deep neural network model may be configured to perform a convolutional neural network (CNN) or You Only Look Once (YOLO) algorithm.

Since objects are distributed in various areas in the image, a bounding box is required to be confirmed in advance to check an exact range of the object before the object is extracted from the image. Navneet Dalal & Bill Triggs introduced that the histogram of oriented gradients (HOG) can treat a real-world problem at low cost. According to the above concept, a hog feature of a support vector machine (SVM) is calculated to execute a pyramid sliding window and classify objects in each window. By using the hog feature, pedestrian detection, face recognition, object extraction, and the like can be extracted in real time from a video.

The CNN may extract objects highly accurately. However, it is very difficult to perform the CNN for a large number of images obtained from the window detection sliding. To solve the above problem, an algorithm considering a region and called "R-CNN" has been introduced. The algorithm may reduce the number of bounding boxes necessary for the object classification. The algorithm may use local information, such as texture, intensity, color, insideness, for selective retrieval. However, 2000 regions generated by the selective retrieval also take a long time upon the CNN processing.

The YOLO divides each image into S×S grids and calculates reliability of the grids. The reliability reflects accuracy upon recognition of the object in the grids. Initially, the bounding box may be set irrelevant to the object recognition. When a position of the bounding box is adjusted by calculating the reliability, the bounding box having the highest accuracy on the object recognition may be obtained. An object class score is calculated to calculate whether an object is included in the grids. As a result, the object of total S×S×N may be estimated. Most of the grids have low reliability. Neighboring grids may be combined to increase the reliability. Then, a threshold may be set to remove an unnecessary part. The YOLO is very fast with simple processing, in which the performance is twice as high as other real-time vision technologies. This is because classes are classified by looking at the whole image at once.

Exemplary embodiments of the present invention use the above deep neural network model based on the CNN and YOLO algorithms. A model using only CNN in the first embodiment, a model using only YOLO in a second embodiment, and a model using a combination of YOLO and CNN in a third embodiment may be selected.

In other words, as described above, CNN has high accuracy in object recognition. YOLO has less accuracy in the object recognition compared to CNN, but YOLO has the advantage in fast recognition speed for objects. In view of the features, the deep neural network model using only CNN may be used, or the deep neural network model using only YOLO may be used.

The models using a combination of YOLO and CNN may be constructed in the following manner. First, image data obtained by preprocessing an image of the sea level is inputted to the YOLO model capable of fast object recognition. When an object is detected based on the output of the YOLO model, an area of the recognized object is extracted from the image data, and an image having the extracted object area is inputted to the CNN model. The CNN model may accurately recognize information on the object by using the above inputted image. In other words, the presence of the object in the image may be detected through the fast processing by the YOLO model, and the exact information on the object may be recognized by using the CNN model from the detected image.

Accordingly, the object recognition information, which is outputted finally (S300), may include information on a size of the object, a type of the object or a distance between the ship and the object, in the model using only CNN, the model using only YOLO, or the model using the combination of YOLO and CNN.

Then, a risk level caused by the object is analyzed based on the object recognition information recognized in the above manner (S400). In one embodiment, the risk level may be analyzed as follows. A fifth level, which is the highest rick level, corresponds to a moving ship, a fourth level corresponds to rock, sea ice, or the like, a third level corresponds to a buoy, a second level corresponds to a sea web, rope, or the like, and a first level, which is the lowest risk level, corresponds to a marine debris. Of course, the risk level may be configured in various ways. In other words, information on the object, such as the moving ship, rock, or sea ice is information outputted from the deep neural network model (S300). The risk level is analyzed from risk level table data constructed as a table in a database with respect to the recognition information on each object (S400).

Then, when the degree of risk is high based on the risk level analyzed in the above manner, the ship is controlled through a ship automatic control device (S510), or a risk notification is performed through an alarm sound, a display on a monitoring screen or the like (S520) to avoid the risk, thereby enabling a crew to recognized the risky situation and take action.

Figure 2:
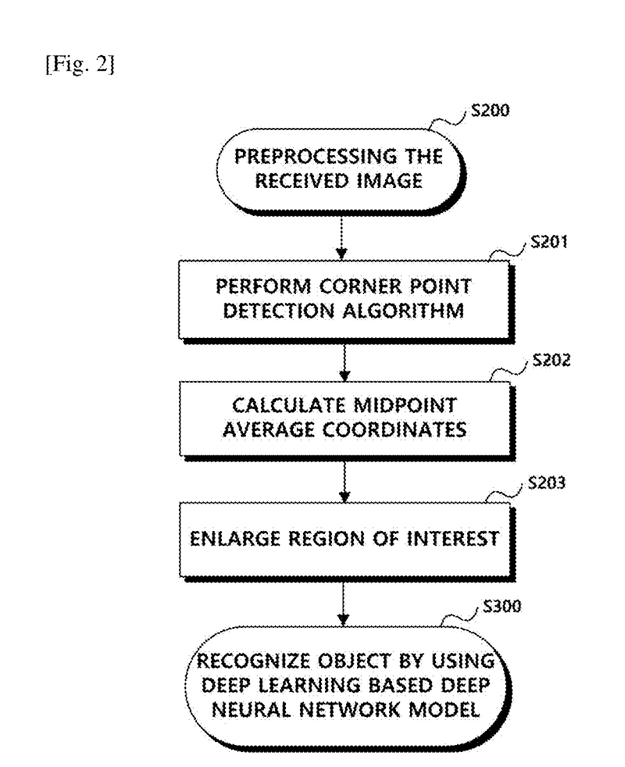
FIG. 2 is a flowchart showing a step of preprocessing an image of a region of interest above sea level, in the method for recognizing an object near a ship by using a deep neural network according to the present invention.
Figure 3A:
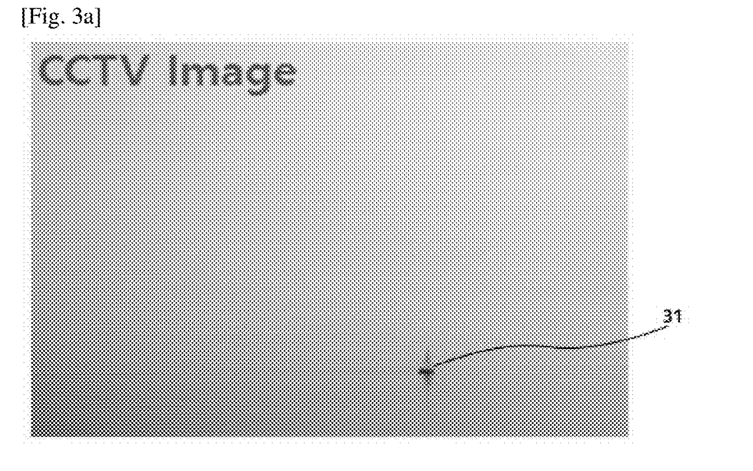
FIGS. 3a, 3b and 3c are views illustrating an image processing process for detecting the object near the ship.
Figure 3B:
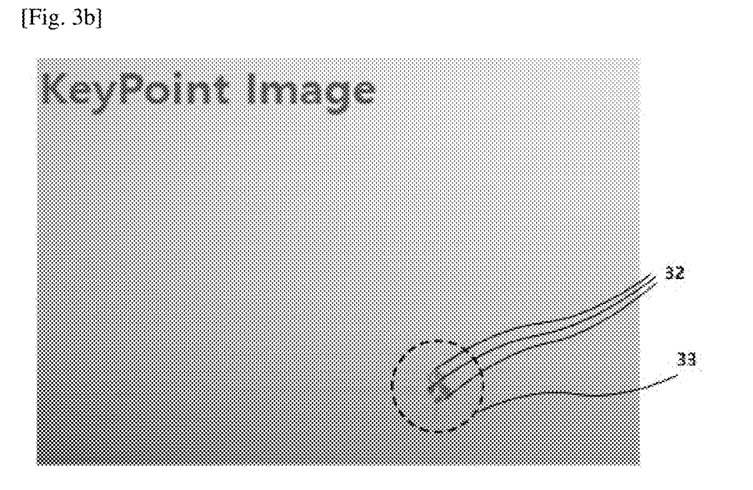
Figure 3C:
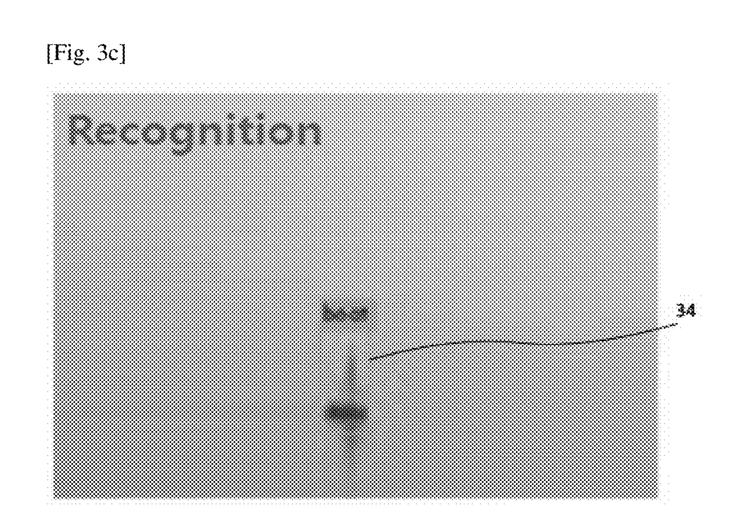

FIG. 2 is a flowchart showing a scheme S200 of preprocessing an image of a region of interest above the sea level, in the method for recognizing an object near a ship by using a deep neural network according to the present invention. FIG. 3a, 3b, 3c are views illustrating an image processing for detecting the object near the ship.

First, after an image (FIG. 3a) being photographed from a camera mounted on a ship is received (S100. See FIG. 1), an image of a region of interest on the sea level is preprocessed (S200. See FIGS. 1 and 2). The preprocessing (S200) will be described in detail as follows.

A corner point detection algorithm is performed on a specific object 31 in the received image (FIG. 3a) (S201). FIG. 3b shows the corner points 32 detected in the image.

The most general approach upon tracking or recognizing an object in an image, or matching the image with another image is to extract major key points from the image and match the key points. The sites, which may be easily distinguished from a surrounding background, may be set as the key points upon matching images. Conditions for good key points in an image are as follows. The object is required to be easily identified even when a shape, size, or position of the object changes, and the corresponding sites are required to be easily found in the image even when a viewpoint or lighting of the camera changes. A corner point is the most suitable key point that satisfies the above conditions in the image. Most key point extraction algorithms are based on the above corner point detection.

A features from accelerated segment test (FAST) algorithm may be used as one of the corner point detection algorithms. FAST was developed by Edward Rosten of the University of Cambridge in United Kingdoms. As can be understood from the name of FAST, FAST is a key point extraction scheme that pursues extreme rapidity. In particular, FAST is outstanding in that quality of the key point (repeatability: the degree in which the same key points are repeatedly detected despite various image changes) is also superior to the existing schemes although FAST is a technology designed to optimize speed. The corner point detection preprocessing using the FAST algorithm, is especially useful to easily find a location of the object in an image at the situation such as fog.

In addition, through an intermediate point average coordinate calculation (S202), the site forming a cluster 33 of the corner points 32 detected in the image may be determined as the object. The corner points 32 have image coordinate (x, y) information, and the midpoint is estimated by averaging x-axis and y-axis coordinates.

In the step of enlarging an image of a region of interest (S203. FIG. 3c) that is performed later, the image is enlarged especially to enhance the image detection rate of the YOLO algorithm. FIG. 3c shows the enlarged object 34. When sizes of the X-axis and the Y-axis are set based on the midpoint coordinates, a size of an image may be enlarged to have width/19 and height/19. This is because the YOLO algorithm divides an image in 19×19 when dividing a grid cell.

Then, as described with reference to FIG. 1, the preprocessed image as described above (S201 to S203) is inputted, as input data, to the deep-learning-based deep neural network model, and information on neighboring object is recognized as an output (S300. See FIG. 1).

Figure 4:
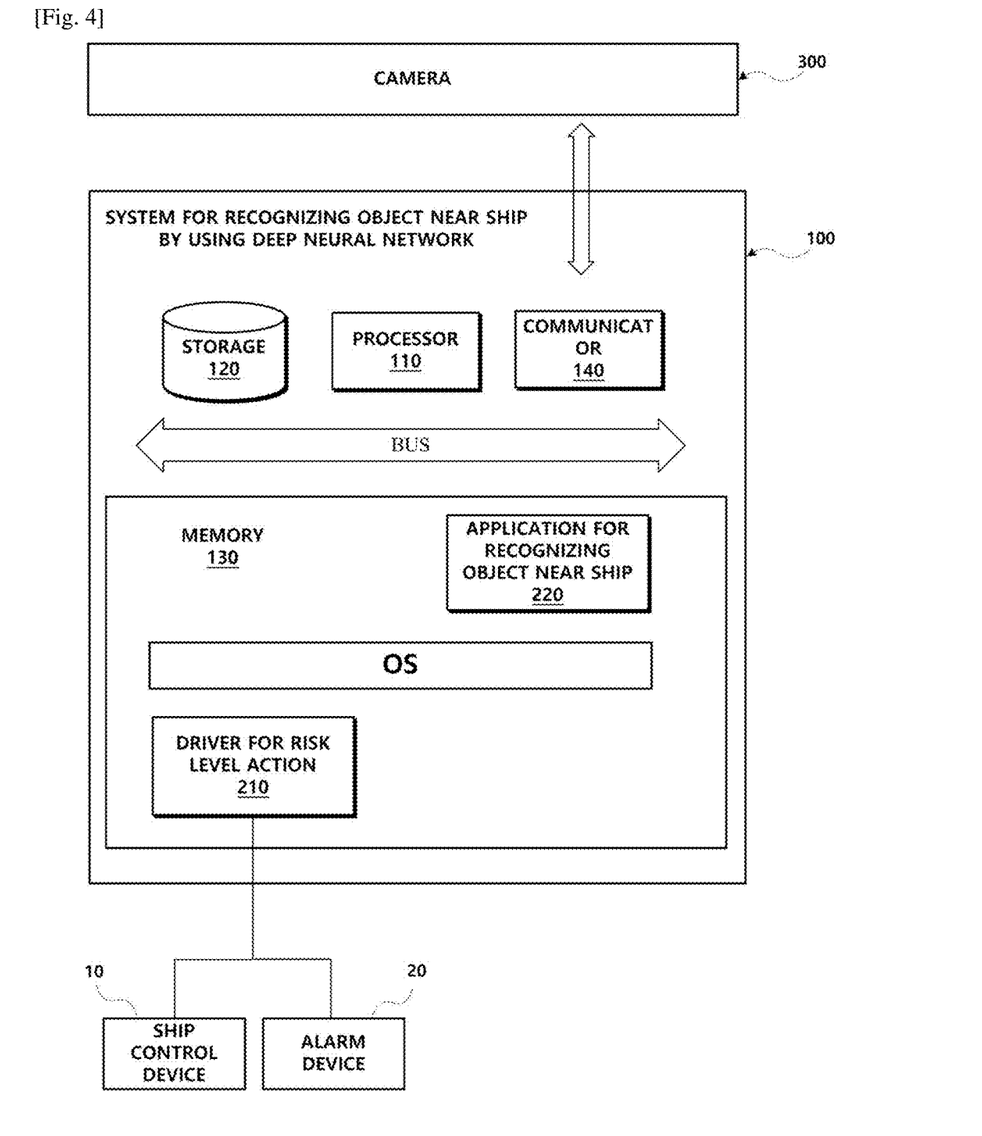
FIG. 4 is a view showing an overall hardware configuration of a system 100 for recognizing an object near a ship by using a deep neural network according to the present invention.
Figure 5:
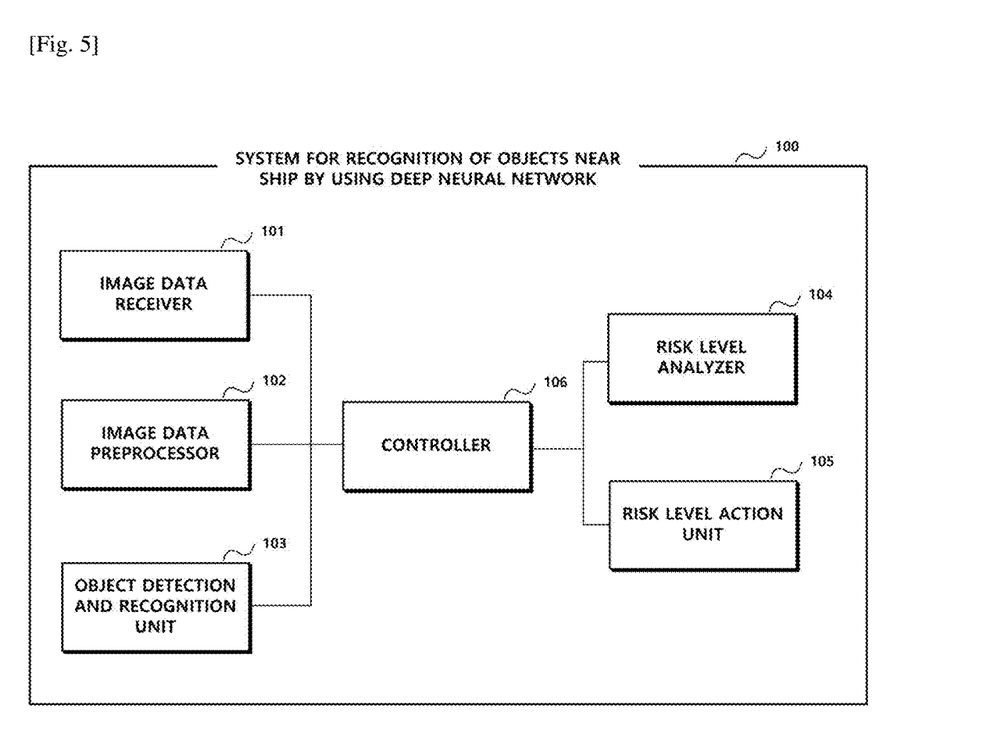
FIG. 5 is a view showing a configuration, according to operating modules, of the system 100 for recognizing an object near a ship by using a deep neural network according to the present invention.

FIG. 4 is a view showing an overall hardware configuration of a system 100 for recognizing an object near a ship by using a deep neural network according to the present invention. FIG. 5 is a view showing a configuration, according to operating modules, of the system 100 for recognizing an object near a ship by using a deep neural network according to the present invention.

The method for recognizing an object near a ship by using a deep neural network according to the present invention have been described in detail with reference to FIGS. 1 to 3. Hereinafter, the system 100, which performs the same function, for recognition of objects near a ship by using a deep neural network will be briefly summarized with respect to functions of configured modules.

Referring to FIG. 4, the system for recognition of objects near a ship by using a deep neural network includes a processor 110, a non-volatile storage 120 configured to store programs and data, a volatile memory 130 configured to store executing programs, a communicator 140 configured to communicate with another device, and a bus serving as an internal communication path between the communicator and the another device. The executing programs may include a device driver, an operating system, and various applications. Although not shown, a power supply unit may be included.

The system 100 for recognition of objects near a ship by using a deep neural network may receive an image being photographed from a camera 300 mounted on a ship.

In addition, as described later, when the degree of risk of an object recognized on the sea is a high risk level, the ship may be controlled through the ship automatic control device 10, or a risk notification may be performed through a notification device 20 such as an alarm sound or a monitoring screen.

An application 220 for recognizing an object near a ship may perform the method for recognizing an object near a ship by using a deep neural network as described with reference to FIGS. 1 to 3. The function of a module that performs the above method will be described as follows with reference to FIG. 5.

An image data receiver 101 may receive an image being photograph by a camera mounted on the ship.

An image data preprocessor 102 may preprocess the received image to use the received image as an input into a deep neural network model according to the present invention for recognizing an object near the ship. The image preprocessing has been described in detail with reference to FIGS. 2 and 3.

An object detection and recognition unit 103 may output information on the object recognized by a deep-learning-based deep neural network model for recognizing an object near the ship, in which the deep neural network model receives an image preprocessed by the image data preprocessor 102 as input data, and information on the recognized object is outputted (S300). The deep neural network model may be configured to perform the CNN algorithm or the YOLO algorithm. The use of the algorithm has been described with reference to FIG. 1.

A risk level analyzer 104 may analyze a risk level caused by the object based on the object recognition information recognized by the object detection and recognition unit 103.

A risk level action unit 105, when the degree of risk is high based on the risk level analyzed by the risk level analyzer 104, may serve to enable a crew to recognized the risky situation and take action by controlling the ship through the ship automatic control device, or performing a risk notification including an alarm sound and a display on a monitoring screen.

A controller 106 may perform a series of processing related to the object recognition near the ship using the deep neural network by controlling the above-described modules 101 to 105.

What is claimed is:

1. A method for recognizing an object near a ship by using a deep neural network, the method comprising:
   (a) receiving an image being photographed from a camera mounted on the ship;
   (b) preprocessing the received image;
   (c) inputting the preprocessed image as input data into a deep-learning-based deep neural network model, and outputting information on an object recognized in the image (hereinafter referred to as 'object recognition information') from the deep neural network model;
   (d) analyzing a risk level due to the object based on the object recognition information outputted from the deep neural network model; and
   (e) taking an action according to the analyzed risk level,
   wherein the deep neural network model includes a convolutional neural network (CNN) model and a You Only Look Once (YOLO) model;
   wherein step (b) includes:
   (b1) detecting corner points of a specific object in the received image by performing a corner point detection algorithm;
   (b2) determining a site forming a cluster of the corner points as an object, and estimating a midpoint of the cluster of the corner points based on coordinates of the detected corner points; and
   (b3) enlarging a part of the received image determined as the object from coordinates of the midpoint in order to enhance image detection rate of the YOLO model:
   wherein step (c) includes:
   (c1) inputting image data obtained by preprocessing the photographed image into the YOLO model capable of fast object recognition;
   (c2) extracting an object area recognized from the image data when the object is recognized from an output of the YOLO model;
   (c3) inputting an image of the extracted object area into the CNN model; and
   (c4) outputting, by the CNN model, the object recognition information;
   wherein the object recognition information includes on a size of the object, a type of the object and a distance between the ship and the object;
   wherein step (d) includes step of analyzing a risk level from risk level table data organized as a table in a database with respect to the object recognition information outputted in step (c);
   wherein the action of step (e) includes controlling the ship through an automatic ship control device for risk aversion and performing a risk notification including an alarm sound and a display on a monitoring screen, when a degree of risk is high based on the risk level analyzed in step (d).

2. A system for recognizing an object near a ship by using a deep neural network, the system comprising:
   at least one processor; and
   at least one memory configured to store a computer executable instruction, wherein
   the computer executable instruction stored in the at least one memory allows the at least one processor to execute:
   (a) receiving an image being photographed from a camera mounted on the ship;
   (b) preprocessing the received image;
   (c) inputting the preprocessed image as input data into a deep-learning-based deep neural network model, and outputting information on an object recognized in the image (hereinafter referred to as 'object recognition information') from the deep neural network model;
   (d) analyzing a risk level due to the object based on the object recognition information outputted from the deep neural network model; and
   (e) taking an action according to the analyzed risk level,
   wherein the deep neural network model includes a convolutional neural network (CNN) model and a You Only Look Once (YOLO) model;

wherein step (b) includes:
(b1) detecting corner points of a specific object in the received image by performing a corner point detection algorithm;
(b2) determining a site forming a cluster of the corner points as an object, and estimating a midpoint of the cluster of the corner points based on coordinates of the detected corner points; and
(b3) enlarging a part of the received image determined as the object from coordinates of the midpoint in order to enhance image detection rate of the YOLO model:
wherein step (c) includes:
(c1) inputting image data obtained by preprocessing the photographed image into the YOLO model capable of fast object recognition;
(c2) extracting an object area recognized from the image data when the object is recognized from an output of the YOLO model;
(c3) inputting an image of the extracted object area into the CNN model; and
(c4) outputting, by the CNN model, the object recognition information;
wherein the object recognition information includes on a size of the object, a type of the object and a distance between the ship and the object;
wherein step (d) includes step of analyzing a risk level from risk level table data organized as a table in a database with respect to the object recognition information outputted in step (c);
wherein the action of step (e) includes controlling the ship through an automatic ship control device for risk aversion and performing a risk notification including an alarm sound and a display on a monitoring screen, when a degree of risk is high based on the risk level analyzed in step (d).

3. A computer program for recognizing an object near a ship by using a deep neural network, wherein the computer program is stored in a non-transitory storage medium and comprises an instruction configured to allow the processor to execute:
(a) receiving an image being photographed from a camera mounted on the ship;
(b) preprocessing the received image;
(c) inputting the preprocessed image as input data into a deep-learning-based deep neural network model, and outputting information on an object recognized in the image (hereinafter referred to as 'object recognition information') from the deep neural network model;
(d) analyzing a risk level due to the object based on the object recognition information outputted from the deep neural network model; and
(e) taking an action according to the analyzed risk level,
wherein the deep neural network model includes a convolutional neural network (CNN) model and a You Only Look Once (YOLO) model;
wherein step (b) includes:
(b1) detecting corner points of a specific object in the received image by performing a corner point detection algorithm;
(b2) determining a site forming a cluster of the corner points as an object, and estimating a midpoint of the cluster of the corner points based on coordinates of the detected corner points; and
(b3) enlarging a part of the received image determined as the object from coordinates of the midpoint in order to enhance image detection rate of the YOLO model:
wherein step (c) includes:
(c1) inputting image data obtained by preprocessing the photographed image into the YOLO model capable of fast object recognition;
(c2) extracting an object area recognized from the image data when the object is recognized from an output of the YOLO model;
(c3) inputting an image of the extracted object area into the CNN model; and
(c4) outputting, by the CNN model, the object recognition information;
wherein the object recognition information includes on a size of the object, a type of the object and a distance between the ship and the object;
wherein step (d) includes step of analyzing a risk level from risk level table data organized as a table in a database with respect to the object recognition information outputted in step (c);
wherein the action of step (e) includes controlling the ship through an automatic ship control device for risk aversion and performing a risk notification including an alarm sound and a display on a monitoring screen, when a degree of risk is high based on the risk level analyzed in step (d).

* * * * *